(12) United States Patent
Landis et al.

(10) Patent No.: US 11,547,065 B2
(45) Date of Patent: Jan. 10, 2023

(54) GEL-BASED HORTICULTURAL PLUG

(71) Applicants: Geoffrey C. Landis, Commerce, CA (US); April Dawson, Commerce, CA (US); Morris Gasmer, Commerce, CA (US)

(72) Inventors: Geoffrey C. Landis, Commerce, CA (US); April Dawson, Commerce, CA (US); Morris Gasmer, Commerce, CA (US)

(73) Assignee: Proterra AG, Inc., Commerce, CA (US)

( * ) Notice: Subject to any disclaimer, the term of this patent is extended or adjusted under 35 U.S.C. 154(b) by 0 days.

(21) Appl. No.: 17/328,811

(22) Filed: May 24, 2021

(65) Prior Publication Data

US 2021/0360881 A1 Nov. 25, 2021

Related U.S. Application Data

(60) Provisional application No. 63/029,207, filed on May 22, 2020.

(51) Int. Cl.
*A01G 24/20* (2018.01)
*A01G 24/40* (2018.01)
*A01G 24/10* (2018.01)

(52) U.S. Cl.
CPC ............ *A01G 24/20* (2018.02); *A01G 24/10* (2018.02); *A01G 24/40* (2018.02)

(58) Field of Classification Search
CPC ........ A01G 24/20; A01G 24/44; A01G 24/40; A01G 24/10; A01G 24/35; A01G 1/00; A01G 22/00; A01G 31/00; A01G 31/02; A01G 5/06; A01G 9/02; A01G 9/10; A01G 9/028; A01G 9/029; A01G 9/0293; A01G 9/0295; A01G 9/2297; A01C 1/02; A01C 1/04; C09K 17/32
See application file for complete search history.

(56) References Cited

U.S. PATENT DOCUMENTS

| | | |
|---|---|---|
| 6,176,037 B1 | 1/2001 | Muramatsu |
| 2018/0184597 A1 | 7/2018 | Van Rooijen |

FOREIGN PATENT DOCUMENTS

| | | |
|---|---|---|
| JP | 09-047154 A | 2/1997 |
| JP | 10-191725 A | 7/1998 |
| WO | WO 2019-006466 A1 | 1/2019 |

OTHER PUBLICATIONS

International Search Report on related PCT Application No. PCT/US2021/033928 from International Searching Authority (KIPO) dated Sep. 8, 2021.
Written Opinion on related PCT Application No. PCT/US2021/033928 from International Searching Authority (KIPO) dated Sep. 8, 2021.

*Primary Examiner* — Kent L Bell
(74) *Attorney, Agent, or Firm* — KOS IP Law LLP

(57) ABSTRACT

A gel plug comprised of a gel may be used for growth of plants. The gel may include two polysaccharide components, with a second of the two components providing increased rigidity Plants may be grown, including from seed, in the gel plug.

11 Claims, 7 Drawing Sheets

GEL-BASED HORTICULTURAL PLUG

CROSS-REFERENCE TO RELATED APPLICATION

This application claims the benefit of the filing date of U.S. Provisional Patent Application No. 63/029,207, filed on May 22, 2020, the disclosure of which is incorporated by reference herein.

FIELD OF THE INVENTION

The present invention relates generally to substrates for use in growing crops, and more particularly to a gel-based substrate for germination and/or growth of plants and crops.

BACKGROUND OF THE INVENTION

Plants and crops are commonly grown in soil or similar growth medium. Soil environments may vary in their suitability for plant and crop growth. Moreover, the various organisms in soil may include organisms deleterious to the growing plants. Perhaps more importantly, the soil may contain organisms deleterious to other plants, which may limit desirability of transporting plants between geographically spread locations. Other growth mediums, for example coco peat, may provide in some aspects limited nutrient provision, or be difficult to provide using automated processes.

BRIEF SUMMARY OF THE INVENTION

Some embodiments provide a gel plug for germination and/or growth of plants.

In some embodiments the gel plug includes a first polysaccharide and a second polysaccharide. In some embodiments the first polysaccharide is a gellan gum. In some embodiments the first polysaccharide is Gelrite (available from RPI Research Products International, IL). In some embodiments the second polysaccharide is chitosan. In some embodiments the gel plug includes approximately 1% Gelrite and 0.0075% chitosan by weight. In some embodiments the gel plug includes approximately 1% Gelrite and 0.0008% chitosan by weight. In some embodiments the gel plug includes approximately 0.2% to 3% Gelrite and approximately 0.0007% to 0.3% chitosan by weight. In some embodiments the gel plug further comprises activated charcoal.

In some embodiments the gel plug is in the form of a cylindrical, conical, or frustoconical solid. In some embodiments the gel plug is in the form of a cavity of a seedling tray.

In some embodiments a seed is on a surface of the gel plug or embedded, partially or wholly, in the gel plug. In some embodiments a seed is within a cavity formed in a top surface of the gel plug. In some embodiments the gel plug is placed in soil or other plant growth medium prior to germination of the seed. In some embodiments the gel plug is placed in soil or other plant growth medium after germination of the seed. In some embodiments the gel plug is placed in a hydroponics system. In some embodiments the gel plug is placed in an aeroponics system. In some embodiments the gel plug is placed in a plant tray, with in some embodiments the plant tray including cavities for a plurality of plants. In some embodiments a plant resulting from germination of the seed is grown to harvest without the gel plug being placed in soil or other plant growth medium.

Some embodiments provide a medium for germination and/or growth of plants, comprising: a plug with a lower surface, an upper surface, and a sidewall interconnecting the lower surface and the upper surface; the plug comprising a first polysaccharide and a second polysaccharide. In some embodiments the first polysaccharide is a gellan gum. In some embodiments the second polysaccharide is chitosan. In some embodiments the plug comprises 1% gellan gum and 0.0075% chitosan by weight. In some embodiments the plug comprises 1% gellan gum and 0.0008% chitosan by weight. In some embodiments the plug comprises 0.2% to 3% gellan gum and 0.0007% to 0.3% chitosan by weight. In some embodiments the plug further comprises activated charcoal.

In some embodiments the plug is a gel plug. Some embodiments further comprise a seed, for germination, on or at least partially within the gel plug. Some embodiments further comprise a plant growing in the gel plug. In some embodiments the gel plug is in a plant tray, the plant tray including cavities for a plurality of plants. In some embodiments the lower surface is of a different shape than the upper surface. Some embodiments further comprise a plurality of plugs each comprising a first polysaccharide and a second polysaccharide, and a plant tray including cavities for the plug and the plurality of plugs, with each of the cavities having a one of the plug or plurality of plugs therein.

These and other aspects of the invention are more fully comprehended upon review of this disclosure.

DETAILED DESCRIPTION

Figure 1:
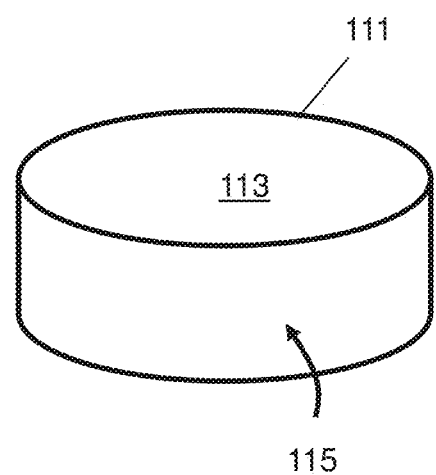
FIG. 1 is a perspective view of an embodiment of a gel plug for plants, in accordance with aspects of the invention.

FIG. 1 is a perspective view of an embodiment of a gel plug 111 for plants, in accordance with aspects of the invention. The gel plug of FIG. 1 is substantially in the form of a cylinder. As such, the disk includes a generally circular upper surface 113, a corresponding lower surface not visible in FIG. 1, and a sidewall 115 interconnecting the upper surface and the lower surface. In the embodiment of FIG. 1, the cylinder has a circular diameter greater than a cylindrical height. In some embodiments the cylinder may have a circular diameter equal to or less than a cylindrical height. In various embodiments the gel plug may have different shapes, some of which are discussed herein or are the subject of other figures herein. In addition, for disk-like gel plugs, in some embodiments the upper and lower surfaces may be in the shape of a square, rectangle, oval, or some other polygonal shape. In some embodiments the upper and lower surfaces may have different shapes.

Although not shown in FIG. 1, the plug may have a seed on the upper surface of the disk, or embedded, partially or wholly, within the plug. In some embodiments the seed may be within a cavity of the upper surface. For embodiments with the seed on the upper surface of the plug, the surface may include a scratch or groove in which the seed may sit. The surface may be roughened, for example through application of a wire brush to the upper surface, to provide a plurality of scratches or grooves in which the seed may sit. Alternatively, the plug may have a plurality of seeds on the upper surface of the plug, within a plurality of cavities in the upper surface of the plug, or embedded within the plug.

In some embodiments the seed may be allowed to germinate in the plug, with the plug later placed on or in some other growth medium. For example, in some embodiments the seed may be allowed to germinate, with the plug later placed in soil or some other growth medium. In some embodiments the plug, with seed, may be placed in the soil or other growth medium prior to germination.

In some embodiments the gel comprises a first polysaccharide and a second polysaccharide. In some embodiments the first polysaccharide is an exopolysaccharide. In some embodiments the first polysaccharide is a gellan gum. In some embodiments the first polysaccharide is Gelrite (available from RPI Research Products International, IL). In some embodiments the second polysaccharide is chitosan. In some embodiments the chitosan provides additional rigidity to the gel plug. In some embodiments the gel plug includes approximately 1% Gelrite and 0.0008% chitosan by weight. In some embodiments the gel plug includes approximately 0.2% to 3% Gelrite and approximately 0.0007% to 0.3% chitosan by weight. Generally, the Gelrite and chitosan are added to one or more solutions. In some embodiments the one or more solutions comprise water and/or fertigation solution. In some embodiments the fertigation solution is slightly acidic, and/or includes trace amounts of one, some, or all of Sodium Nitrate or other nitrogen source, potassium, copper, zinc, manganese, iron, boron, calcium, and/or magnesium. In some embodiments the solution has a conductivity between 1.0 and 1.4, inclusive, milliSiemens per centimeter. In some embodiments the solution includes added calcium and/or magnesium cations so as to have increased conductivity. In some embodiments the solution includes calcium and/or magnesium cations to provide divalent ions to bind to carboxylic acids of the Gelrite.

In some embodiments the gell may be formed by dissolving Gelrite into a fertigation solution, dissolving chitosan in a second solution, and heating the dissolved Gelrite solution and mixing in the dissolved chitosan solution. In some embodiments cations may be added to the combined solution. In some embodiments activated charcoal may be added to the combined solution. The combined solution may be poured into a shaped container and allowed to gel.

In some embodiments the gel plugs may be formed as follows.

1. Sol-1: Gelrite Solution. Dissolve 40-g of Gelrite (RPI Research Products International, IL) into 4-L cold fertigation water. In some embodiments the fertigation water contains 850 ppm nitrate, 148 ppm calcium 259 ppm potassium, 39 ppm magnesium, 224 ppm sulfate, 0.11 ppm copper, 2.12 ppm zinc, 0.4 ppm manganese, 3.33 ppm iron, 0.31 ppm boron, and 0.05 ppm molybdenum.) Stir (400-500 rpm) the Gelrite until it is completely dissolved/hydrated in the solution (<30-min). The pH and EC may be checked, preferably the pH is 5.6 and the EC is 1.4 milliSiemens per centimeter.

Sol-2: Chitosan Solution. Added 35-mg of Chitosan (75-mg of Chitosan in some embodiments) to 200-mL of fertigation solution with stirring. Then add 50-mL of Ethanol to the solution. Add 0.05-mL of HNO3 and heat the solution to 90° C. Preferably the chitosan polymer has completely dissolved into the solution.

3. Sol-3: Non-Cation Gelrite/Chitosan mixture. After the Gelrite is completely hydrated, heat the solution until the gel is completely dissolved (to boiling). There are believed to be enough divalent ions in the fertigation solution to bind to the carboxylic acids in the polymer chain that contributes to a stronger gel strength as it cools and gels below 50° C. While the Gelrite solution is stirring (400-500 rpm, preferably no splashing) slowly add Sol-2 to the Sol-3. Preferably the two solutions are mixed well. Preferably there little or no build up of Chitosan on the propeller or spindle of the stirrer. Preferably any foam that forms is mixed back into the solution. Preferably the solution is mixed for at least 30 minutes.

4. Sol-4: Cation Activated Gelrite/Chitosan mixture. Add small 200-mg aliquots of Ca(OH)2 into Sol-3 until the pH paper is show a pH of 6-7. Then add 5.6 g of Calcium Chloride, or, preferably, 7-g of Tetra Cor-Clear (available from Tetra Chemicals, TX). And let the solution mix for a while, for example 15 minutes. In some embodiments then slowly begin to add 50-g of fine activated charcoal to the mixture.

5. Pour the mixture into one or more shaped containers, to provide one or more gel plugs. In some embodiments the mixture is the Cation Activated Gelrite/Chitosan mixture, without the activated charcoal. In some embodiments the mixture is the Cation Activated Gelrite/Chitosan mixture, with the activated charcoal Allow the mixture to cool. In some embodiments a portion of the gel is removed, with the removed portion filled the Non-Cation Gelrite/Chitosan mixture. In some embodiments the portion removed may be in the form of a cylindrical volume extending into the gel from a top surface of the gel. Once cool, the gel plugs may be removed from the trays.

The use of both the Gelrite and the Chitosan provides, for example, additional stability to the gel plugs. The additional stability may allow the gel plugs to substantially avoid decomposition, or avoid complete decomposition, over a course of 2 weeks, in some embodiments, or until a plant grown in the gel plugs is ready for harvest, in some embodiments.

The activated charcoal may be used to decrease passage of light through the gel to roots of the plants. In addition, use of the activated charcoal appears to increase penetration of roots of the plant into the gel, instead of for example the roots extending along a surface of the gel. For example, it appears that for seeds germinated on or near a surface of the gel, roots formed after germination are more likely to grow into the gel as opposed to extending along a surface of the gel.

Seeds for growing of the plants may be placed in cavities extending into the gel from a top or upper surface of the gel plug. The cavities may, for example, have a depth of one-eight of an inch. Alternatively, in some embodiments they may be roughened, for example using a wire brush, with the seeds placed in crevices or scratches loaned by the roughening. In some embodiments the seeds may be simply deposited on a surface of the gel plugs. For all of these cases, in some embodiments the seeds are placed on or in the gel prior to substantial hardening of the gel, and in some embodiment the seeds are placed on or in the gel after hardening of the gel.

Figure 2:
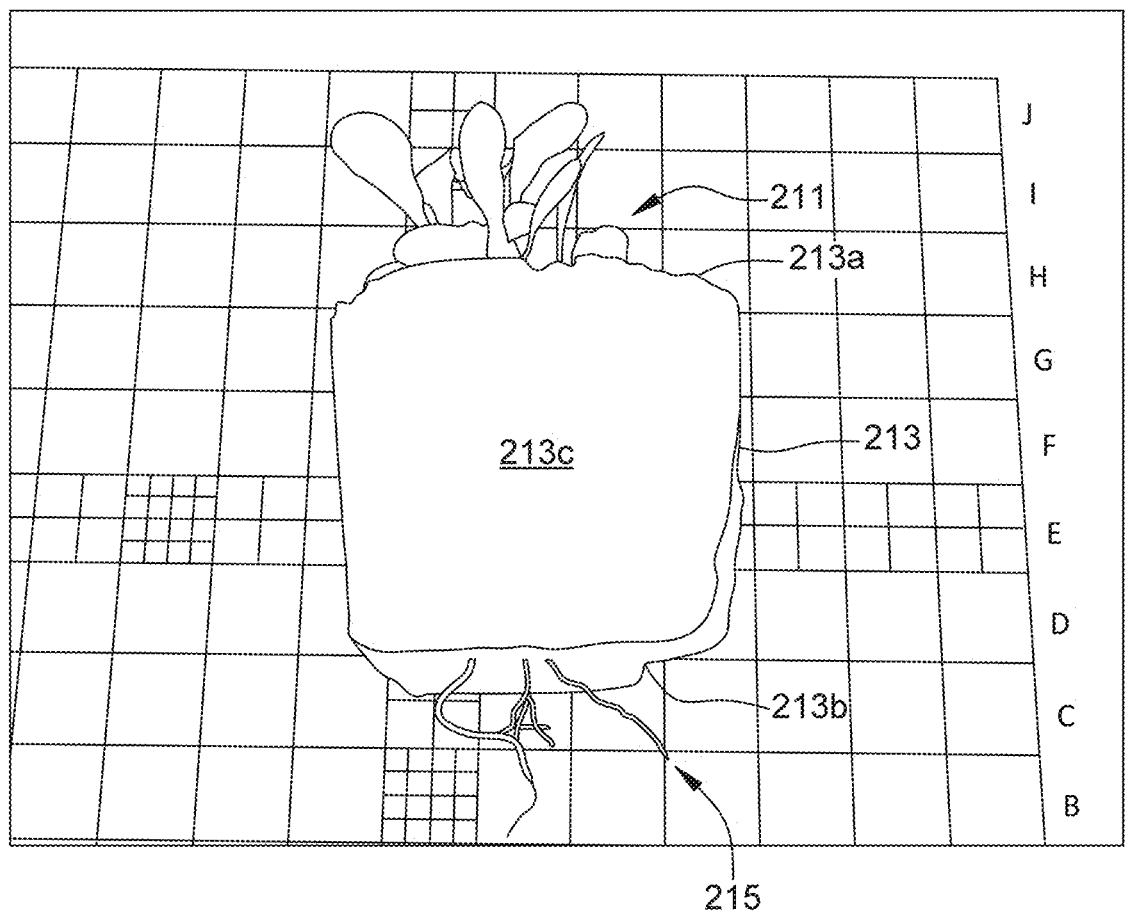
FIG. 2 shows a plant growing in a further embodiment of a gel plug in accordance with aspects of the invention.

FIG. 2 shows a plant 211 growing in a further embodiment of a gel plug 213 in accordance with aspects of the invention. The gel plug is generally cylindrical in shape, with a top surface 213a and a bottom surface 213b generally having a circular shape, and the top and bottom surfaces connected by a sidewall 213c. For the embodiment of FIG. 2, height of the sidewall is approximately equal to diameter of the top and bottom surfaces. The plant has leaves extending above the top surface of the gel plug, and roots 215 extending through the bottom surface of the gel plug.

The gel plug of FIG. 2 is formed of a mixture of Gelrite and chitosan, for example as discussed above. Although activated charcoal is not used in the formulation for the gel plug of FIG. 2, in some embodiments activated charcoal may be so used.

In some embodiments the plant may be grown to harvest in the gel plug. In some embodiments the gel plug may be placed in some other plant growth medium. In such embodiments, the gel plug may decompose over time.

Figure 3:
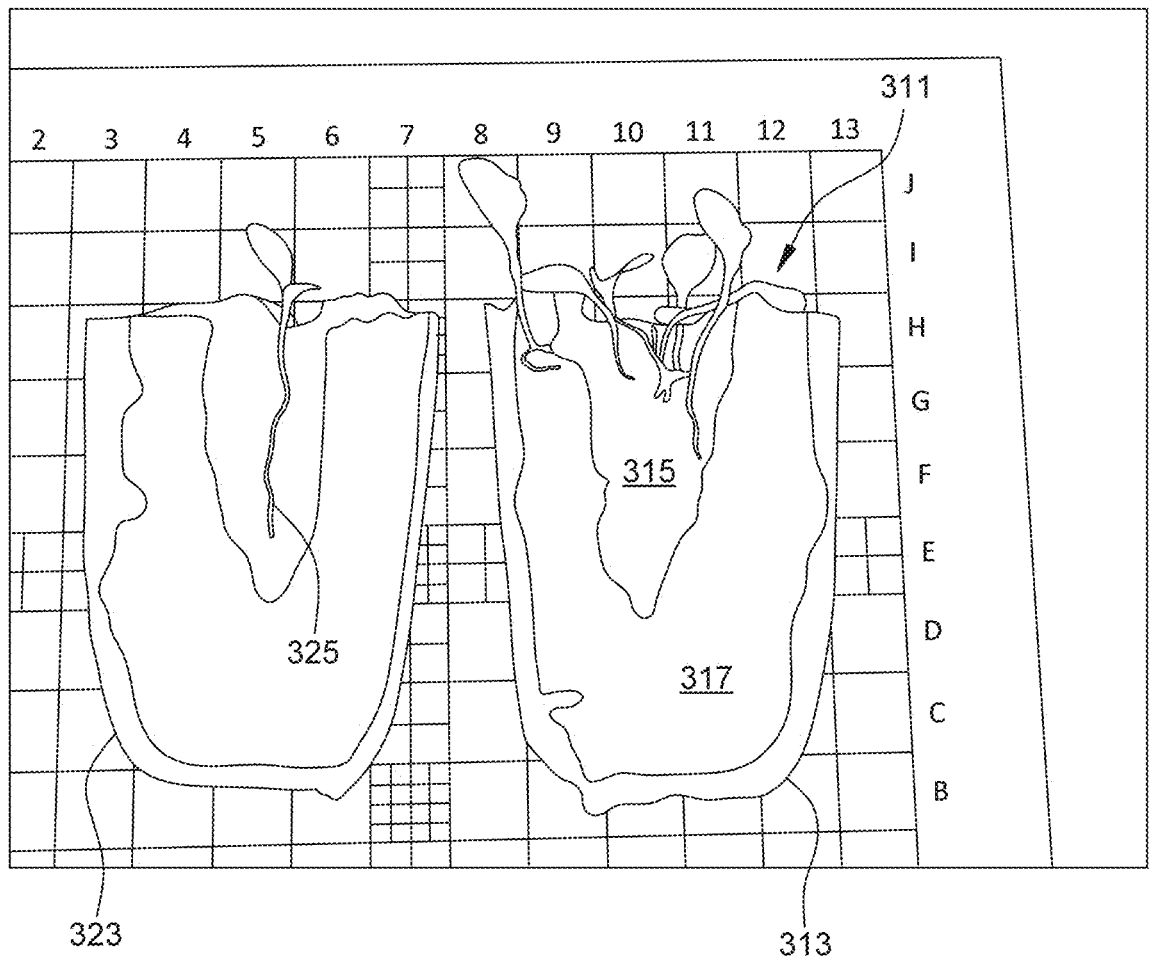
FIG. 3 shows plants growing in yet further embodiments of a gel plug in accordance with aspects of the invention.

FIG. 3 shows plants growing in yet further embodiments of a gel plug in accordance with aspects of the invention. In FIG. 3, two similar gel plugs 313, 323 are shown, each with a growing plant, for example plant 311 of gel plug 313. The gel plugs of FIG. 3, like the gel plugs of FIG. 2, are generally cylindrical in shape. The gel plugs of FIG. 3, however, have a sidewall height approximately fifty percent greater than diameters of top and bottom surfaces.

The gel plugs of FIG. 3 are comprised of two different mixtures. In some embodiments, including those of FIG. 3, the gel plugs include an outer layer, for example 317 of gel plug 313, of a first gel mixture, and an inner core, for example 315 of gel plug 313. The outer layer may be, for example, formed using the cation activated mixture, while the inner core may be formed using the non-cation activated mixture. In some embodiments the gel plug may be first formed using the cation activated mixture, with a core removed from the formed gel and the resulting void filled with non-cation activated mixture. The removed core may, for example form a cavity extending downward from a top surface of the gel plug, and may extend down one-half to three-quarters a length of the height of the gel plug. With the use of the non-cation activated mixture, root structures of the plants may be more visible, for example root structure 325 of the plant in gel plug 323.

Figure 4A:
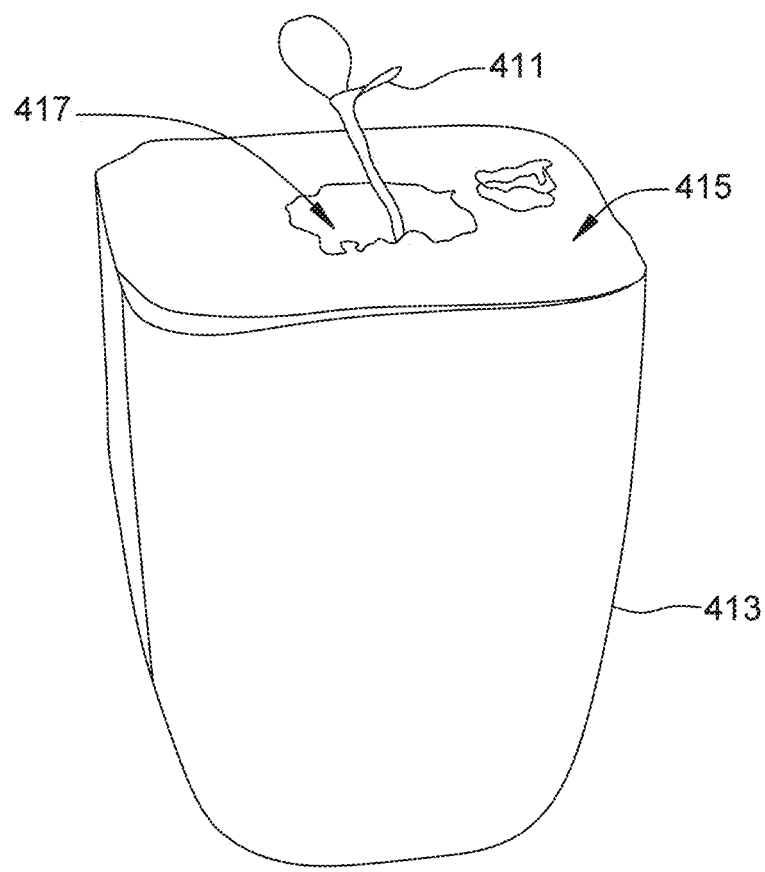
FIGS. 4A and 4B show plants growing in yet still further embodiments of a gel plug in accordance with aspects of the invention.
Figure 4B:
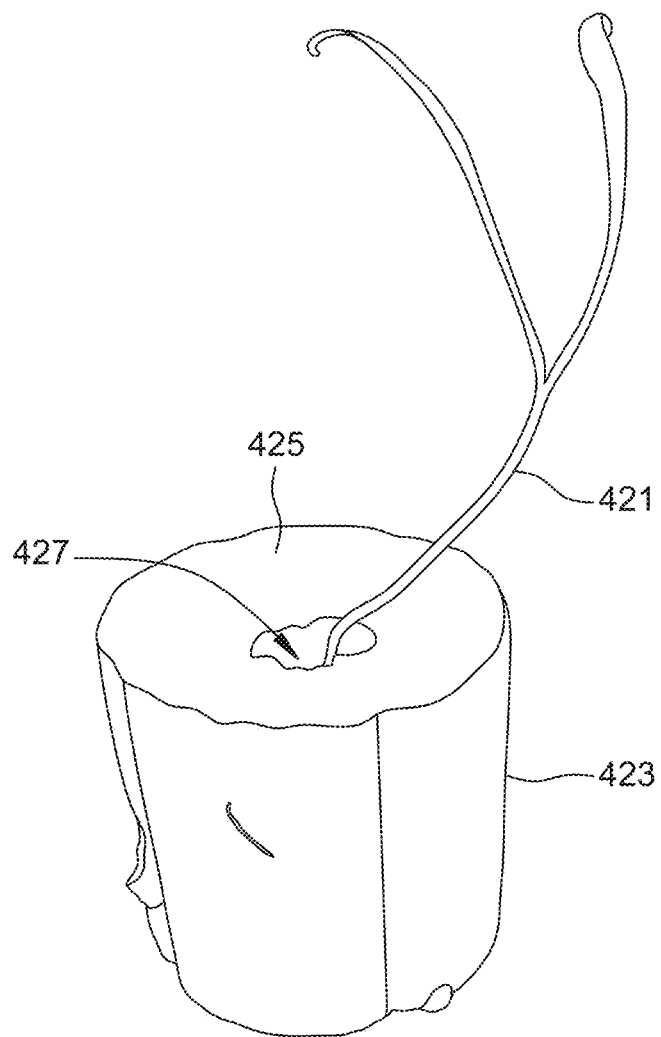

FIGS. 4A and 4B show plants growing in yet still further embodiments of a gel plug in accordance with aspects of the invention. Both of the gel plugs of FIGS. 4A and 4B include activated charcoal. As may be seen in FIGS. 4A and 4B, the gel plugs include sufficient activated charcoal so as to be generally opaque to light, such that the roots of the seedlings are not exposed to light through the body of the gel plug. In addition, as mentioned above, use of the activated charcoal has been found beneficial in reducing growth roots along surfaces of the upper surfaces of the gel, instead of into the body of the gel.

FIG. 4A shows a lettuce seedling 411 growing in a gel plug 413. The seedling is growing out of a cavity 415 formed in a top surface 415 of the gel plug. The gel plug of FIG. 4A was formed by pouring mixture into a cavity of a plant tray, for example a 72 plant tray (which may at times be termed a seedling tray), with a bottom hole, if any, of the cavity of the plant tray covered. The gel plug therefore has a same shape as that of a volume of the cavity of the plant tray. In FIG. 4A, the shape of the plug includes sidewalls defining a substantially square cross-section with rounded corners, tapered slightly towards a bottom of the plug.

FIG. 4B also shows a lettuce seedling 421 growing in a gel plug 423. As with FIG. 4A, the seedling is growing out of a cavity 425 in a top surface 425 of the gel plug. The gel plug of FIG. 4B, however, is generally cylindrical in shape, with longitudinal linear indentations from a bottom surface to the top surface. In some embodiments there may be 4 to 5 such indentations, and the indentations may be evenly spaced.

FIGS. 5A-E show holders for gel plugs, in accordance with aspects of the invention. The holders may be used to hold the gel plugs while the plants in the gel plugs are growing. The holders may be used to hold the gel plugs in a grow wall of an aeroponics plant growth system, for example. In some embodiments the holders may be used to hold the gel plugs in a hydroponics plant growth system.

Each of the holders of FIGS. 5A-E includes a beam 511. The beam includes a plurality of apertures to hold gel plugs. In some embodiments, and as shown in FIGS. 5A-E, the apertures are arranged linearly along the beam, and generally evenly spaced. In some embodiments, pairs of legs are at opposing ends of the beams, with forward legs 517a,b of each of the pairs of legs visible in FIGS. 5A-E, with rearward legs of the pairs of legs behind the forward legs. The forward legs and rearward legs extend away from each other, such that the gel plug holder may rest on the ground or floor on ends of the legs, with gel plugs in the aperture away from the ground or floor.

Figure 5A:
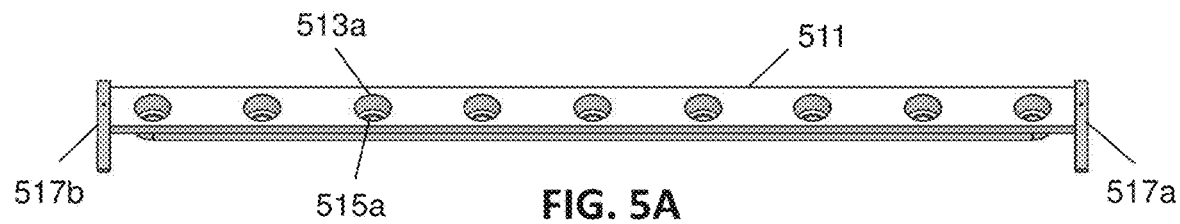
FIGS. 5A-E show holders for gel plugs, in accordance with aspects of the invention.
Figure 5B:
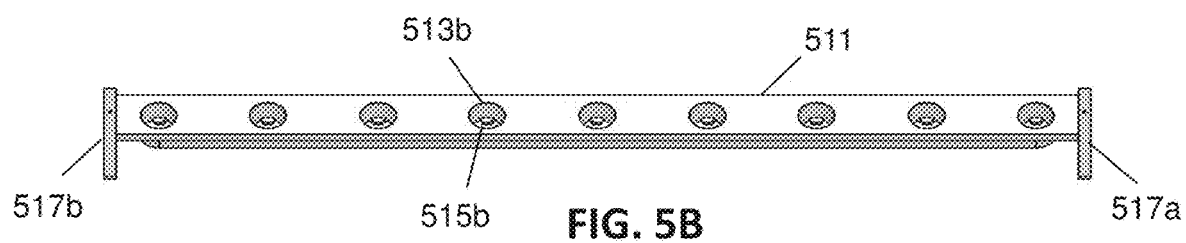
Figure 5C:
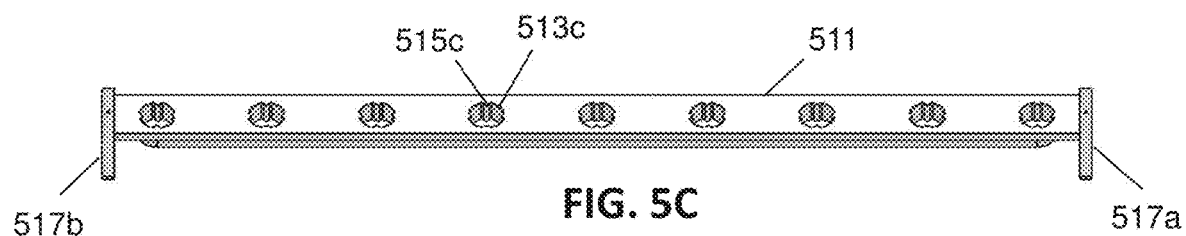
Figure 5D:
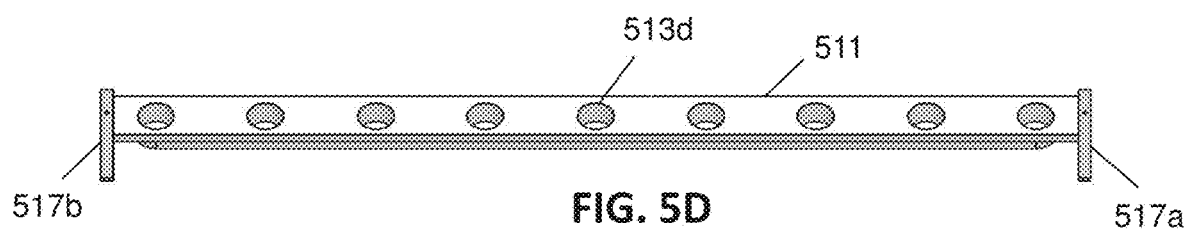
Figure 5E:
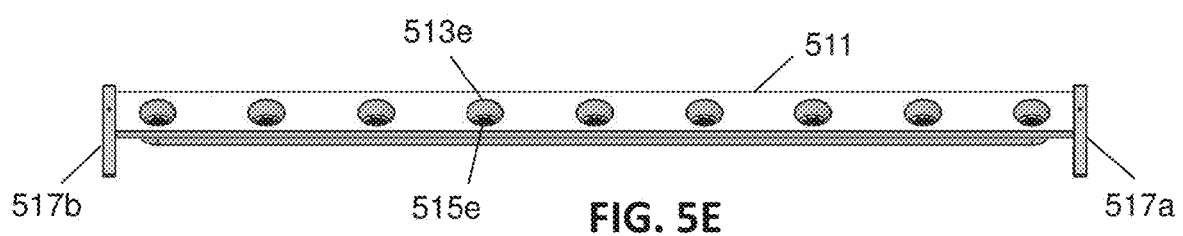

The holders of FIGS. 5A-E differ in their structures for holding the gel plugs in place. In the embodiment of FIG. 5A, each aperture, for example aperture 513a, includes a lip facing inward about a bottom of the aperture, for example lip 515a. In some embodiments the lip intrudes into the aperture a sufficient distance that a gel plug in the aperture may not pass by the lip. In the embodiment of FIG. 5B, each aperture, for example aperture 513b, includes one or more tabs (two tabs opposing tabs in some embodiments) facing inward about a bottom of the aperture, for example tab 515b. In some embodiments the tab(s) intrude into the aperture a sufficient distance that a gel plug in the aperture may not pass by the tab(s). In the embodiment of FIG. 5C, each aperture, for example aperture 513c, includes one or more ribs facing inward through a length of the aperture, for example rib 515c. In some embodiments the gel plugs, being somewhat pliable, may be held in place frictionally through contact with the ribs. In the embodiment of FIG. 5D each aperture, for example aperture 513d, tapers from a larger top diameter to a smaller bottom diameter. In some embodiments the size of the smaller bottom diameter is insufficient to allow passage by the gel plugs. In the embodiment of FIG. 5E, each aperture, for example aperture 513e, may be considered more akin to a cavity, with a perforated base 515e at its bottom.

Figure 6:
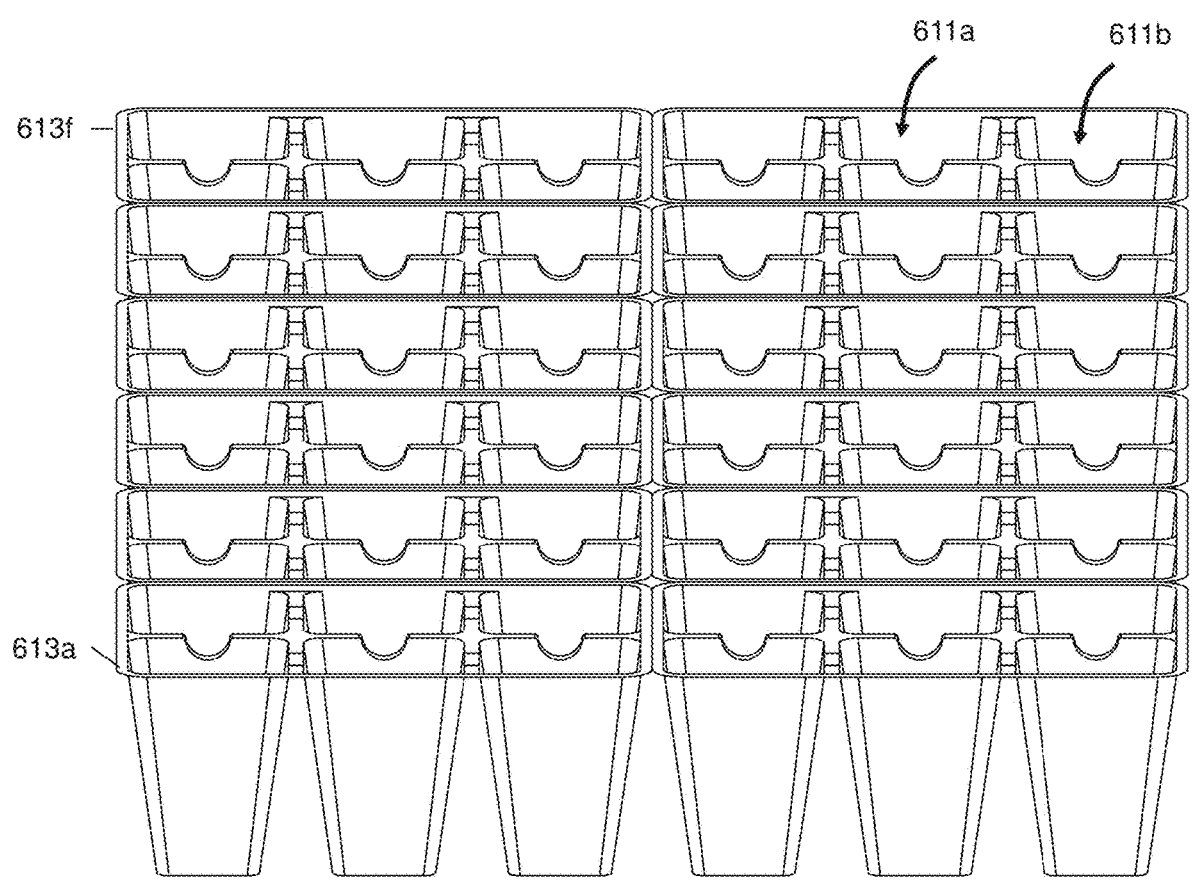
FIG. 6 shows a plant tray for holding gel plugs, in accordance with aspects of the invention.

FIG. 6 shows a plant tray for holding gel plugs, in accordance with aspects of the invention. The plant tray of FIG. 6 is a 72 plant tray. In various embodiments other trays may be used, for example a 6 plant tray. The plant tray of FIG. 6 includes a plurality of cavities, for example cavities 611a,b for growth of plants, which may be seedlings. The cavities are arranged in twelve parallel rows 613a-f of six cavities each, in various embodiments the cavities may be otherwise arranged.

In some embodiments the plant tray may also be used for forming gel plugs from mixture. The gel plugs so formed would therefore necessarily fit into the cavities, with plants planted, for example from seed or seedlings, in the gel plugs. In some embodiments the gel plugs may have a volume less than that of the cavities, and the cavities may additionally include soil, peat, or some other growth medium, for example under the soil. In some embodiments the plants may be grown to harvest in a plant tray, particularly if the plant tray includes larger cavities. In some embodiments the plants may be partially grown in the plant tray, and later transplanted into some other growth medium.

Although the invention has been discussed with respect to various embodiments, it should be recognized that the invention comprises the novel and non-obvious claims supported by this disclosure.

What is claimed is:

1. A medium for germination and/or growth of plants, comprising:
   a plug with a lower surface, an upper surface, and a sidewall interconnecting the lower surface and the upper surface;
   the plug comprising a gellan gum and chitosan, the plug comprising 0.0007% to 0.3% chitosan by weight.

2. The medium of claim 1, wherein the plug comprises 1% gellan gum and 0.0075% chitosan by weight.

3. The medium of claim 1, wherein the plug comprises 1% gellan gum and 0.0008% chitosan by weight.

4. The medium of claim 1, wherein the plug comprises 0.2% to 3% gellan gum by weight.

5. The medium of claim 1, wherein the plug further comprises activated charcoal to decrease passage of light though the plug.

6. The medium of claim 1, wherein the plug is a gel plug.

7. The medium of claim 6, further comprising a seed, for germination, on or at least partially within the gel plug.

8. The medium of claim 6, further comprising a plant growing in the gel plug.

9. The medium of claim 6, wherein the gel plug is in a plant tray, the plant tray including cavities for a plurality of plants.

10. The medium of claim 6, wherein the lower surface is of a different shape than the upper surface.

11. The medium of claim 1, further comprising a plurality of plugs each comprising a first polysaccharide and a second polysaccharide, and a plant tray including cavities for the plug and the plurality of plugs, with each of the cavities having a one of the plug or plurality of plugs therein.

* * * * *